United States Patent
Koka et al.

(10) Patent No.: US 9,748,806 B2
(45) Date of Patent: Aug. 29, 2017

(54) PERMANENT MAGNET ROTATING ELECTRICAL MACHINE AND A MOTOR VEHICLE USING SAME

(71) Applicant: Hitachi Automotive Systems, Ltd., Hitachinaka-shi, Ibaraki (JP)

(72) Inventors: Hidetoshi Koka, Tokyo (JP); Satoshi Kikuchi, Tokyo (JP); Yutaka Matsunobu, Hitachinaka (JP); Yasuyuki Saito, Hitachinaka (JP); Sadahiro Hamahata, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 499 days.

(21) Appl. No.: 14/396,205

(22) PCT Filed: Mar. 25, 2013

(86) PCT No.: PCT/JP2013/058484
§ 371 (c)(1),
(2) Date: Oct. 22, 2014

(87) PCT Pub. No.: WO2013/161474
PCT Pub. Date: Oct. 31, 2013

(65) Prior Publication Data
US 2015/0115758 A1    Apr. 30, 2015

(30) Foreign Application Priority Data

Apr. 23, 2012   (JP) ................................ 2012-097257

(51) Int. Cl.
*H02K 1/27*   (2006.01)
*B60L 11/18*   (2006.01)
*H02K 21/14*   (2006.01)

(52) U.S. Cl.
CPC ........ *H02K 1/2773* (2013.01); *B60L 11/1803* (2013.01); *H02K 1/2766* (2013.01); *H02K 21/14* (2013.01); *Y02T 10/641* (2013.01)

(58) Field of Classification Search
CPC .... H02K 1/2766; H02K 21/14; H02K 1/2773; H02K 1/27; B60L 11/1803; B60L 11/18; Y02T 10/641
(Continued)

(56) References Cited

U.S. PATENT DOCUMENTS

2013/0015727 A1*   1/2013   Iki .......................... H02K 1/246
                                                                310/49.43

FOREIGN PATENT DOCUMENTS

| JP | 2002-354728 A | 12/2002 |
| JP | 2008-43094 A | 2/2008 |

(Continued)

OTHER PUBLICATIONS

International Search Report (PCT/ISA/210) dated Jun. 25, 2013 with English translation (six pages).

*Primary Examiner* — Naishadh Desai
(74) *Attorney, Agent, or Firm* — Crowell & Moring LLP

(57) ABSTRACT

A permanent magnet rotating electrical machine includes a rotor which has permanent magnets buried in a plurality of permanent magnet insertion slots that are provided in a rotor core, and the rotor is rotatably supported by a rotary shaft with a gap on the inner peripheral side of a stator. When the axis of magnetic flux for the permanent magnet is set as a d-axis and the position deviated from the d-axis by electrical angle of 90° is set as a q-axis, the permanent magnet insertion slot is located on the q-axis and a first permanent magnet magnetized in the direction orthogonal to the q-axis is buried in the permanent magnet insertion slot. The permanent magnet insertion slot is located on the d-axis and a (Continued)

second permanent magnet magnetized in the direction parallel to the d-axis is buried in the permanent magnet insertion slot, while at least one or more third permanent magnets buried in the permanent magnet insertion slots are provided between the first permanent magnet and the second permanent magnet. Thereby, the environmental load discharged from a motor vehicle is reduced.

19 Claims, 13 Drawing Sheets

(58) Field of Classification Search
USPC ............. 310/156.53, 156.56, 156.01, 156.07
See application file for complete search history.

(56) References Cited

FOREIGN PATENT DOCUMENTS

| | | |
|---|---|---|
| JP | 2011-41433 A | 2/2011 |
| JP | 2011-50216 A | 3/2011 |
| JP | 2011-61996 A | 3/2011 |
| JP | 2012-29514 A | 2/2012 |

* cited by examiner

PERMANENT MAGNET ROTATING ELECTRICAL MACHINE AND A MOTOR VEHICLE USING SAME

TECHNICAL FIELD

The present invention relates to a permanent magnet rotating electrical machine and a motor vehicle using the same.

BACKGROUND ART

A rotating electrical machine for a vehicle, e.g., a drive motor for a hybrid electric vehicle, needs acceleration performance such as start performance and passing performance, and instantaneous acceleration torque is, therefore, required of the motor.

In a case of a rotating electrical machine used for automobile application, a permanent magnet rotating electrical machine is used as a motor order to generate this instantaneous acceleration torque, and the generation of instantaneous, highly responsive torque is achieved by carrying a high current. The use of the high current described above, however, entails a problem of the loss of circuits in switching elements and bus bars of an inverter, resulting in an increase in the volume of the inverter for the need to take measures against generation of heat.

Owing to this, it is desired to reduce current in the inverter at the time of the generation of instantaneous torque, that is, to improve torque characteristics of the permanent magnet rotating electrical machine.

The torque components of the permanent magnet rotating electrical machine are roughly divided into magnet torque which is represented as a product of magnetic flux of the permanent magnet and the carried current and reluctance torque which is generated by the difference between d-axis reluctance and q-axis reluctance of a rotor. Improvement of the torque characteristics of the permanent magnet rotating electrical machine may be paraphrased as improvement of these torque components.

In order to increase the aforementioned magnetic torque components, it is a short cut to configuring the permanent magnet rotating electrical machine to make the surface area of the permanent magnets larger and to increase the magnetic flux of the permanent magnets. Specifically, a common practice is to increase the size of the rotating electrical machine.

However, in considering that vehicle fuel consumption increases in proportion to a vehicle body weight, it is essential to reduce the vehicle body weight to meet the recent demands for reducing environmental loads. Specifically, it is strongly desired to achieve downsizing and lighter weight including mounting space restriction for any of the components including the rotating electrical machine installed in a vehicle body. Specifically, even for the rotating electrical machine, size increase is not an option for the improvement of torque.

In relation to the aforementioned, Patent Literature 1 discloses a technique for utilizing reluctance torque and magnetic torque.

CITATION LIST

Patent Literature

Patent Literature 1: JP-A-2002-354728

SUMMARY OF INVENTION

Technical Problem

Heavy use of the reluctance torque leads to increase in inductance in a machine, which deteriorates the power factor and increases an inverter capacity and a battery capacity, resulting in an increase in weights of the components other than the rotating electrical machine. Accordingly, the fuel consumption and the environmental loads may disadvantageously increase.

An object of the present invention is, therefore, to provide a rotating electrical machine capable of improving a torque characteristics of the rotating electrical machine. Another object of the present invention is to reduce the emission of environmental loads from a motor vehicle by using the rotating electrical machine of the present invention.

Solution to Problem

In order to solve the aforementioned problems, a configuration set forth in claims, for example, is applied. The present application includes a plurality of means for solving the aforementioned problems, one example of which is as follows. A permanent magnet rotating electrical machine includes a stator including armature windings in a plurality of slots formed in a stator core; and a rotor including a rotor core and permanent magnets buried in a plurality of permanent magnet insertion holes provided in the rotor core, the permanent magnet rotating electrical machine the rotor being rotatably supported by a rotary shaft via a gap on an inner circumferential side of the stator, wherein when an axis of magnetic flux for the permanent magnet is set as a d-axis and a position deviated from the d-axis by an electric angle of 90 degrees is set as a q-axis, one of the permanent magnet insertion holes is located on the q-axis and a first permanent magnet magnetized in a direction orthogonal to the q-axis is buried in the permanent magnet insertion hole, one of the permanent magnet insertion holes is located on the d-axis and a second permanent magnet magnetized in a direction parallel to the d-axis is buried in the permanent magnet insertion hole, and at least one third permanent magnets buried in one of the permanent magnet insertion holes is provided between the first permanent magnet and the second permanent magnet.

Advantageous Effects of Invention

According to the present invention, in the permanent magnet rotating electrical machine, a magnetic flux amount for the permanent magnets can be increased in a limited cross-section of the rotor core, improvement of performance, e.g., improvement in both torque and power, and downsizing of the permanent magnet rotating electrical machine can be achieved. Furthermore, in the motor vehicle having the permanent magnet rotating electrical machine, the environmental loads can be reduced by lowering the fuel consumption of the motor vehicle.

Solutions to problem, configurations, and effects other than those described above will be clear in the following description of embodiments.

DESCRIPTION OF EMBODIMENTS

Hereinafter, embodiments of the present invention will be described with reference to the drawings.

The embodiments, which will be described later, solve various problems for achievement of product implementation, beyond the aforementioned contents in "Technical Problem" part and "Advantageous Effects of Invention" part. Solutions will be specifically described in the following embodiments.

Embodiment 1

Figure 1:
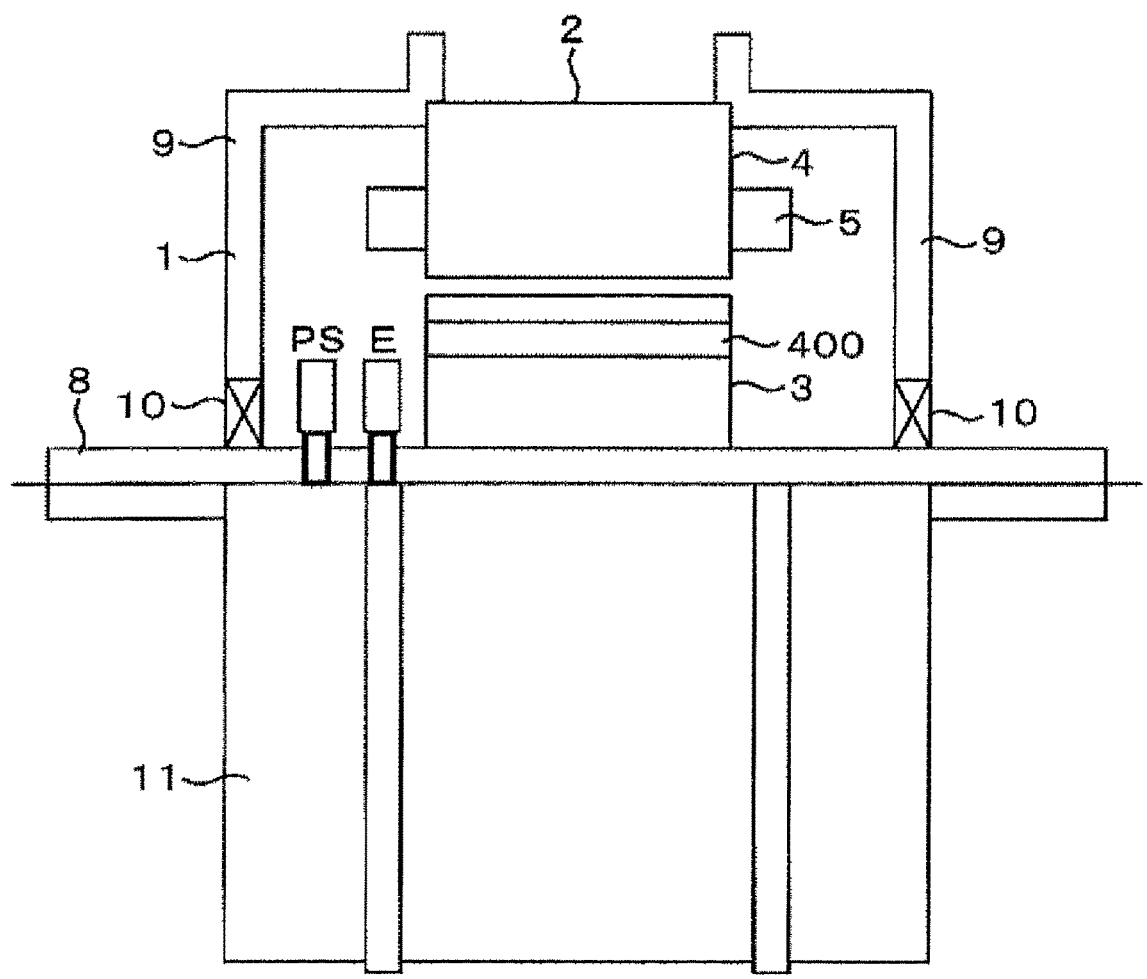
FIG. 1 is a partial cross-sectional view of a rotating electrical machine according to Embodiment 1 of the present invention.

Embodiment 1 of the present invention will be described with reference to FIGS. 1 to 4. FIG. 1 is a partial cross-sectional view of a rotating electrical machine 1 using permanent magnets according to the embodiment of the present invention. A stator 2, which is included in the rotating electrical machine 1 using the permanent magnets, includes a stator core 4 and three-phase or multiphase stator windings 5 wound around slots formed in the stator core 4. The stator 2 is housed and held in a housing 11. A rotor 3 includes a rotor core 7 provided with magnet insertion holes 6 into which permanent magnets are inserted, permanent magnets 400 inserted into the magnet insertion holes 6 formed in the rotor core 7 for forming magnetic poles of the rotor, and a shaft 8. The shaft 8 is rotatably held in end brackets 9, which are fixed at both ends of the housing 11, by bearings 10.

The rotating electrical machine 1 includes a magnetic pole position detector PS for detecting a magnetic pole position of the rotor 3. The magnetic pole position detector PS is formed of a resolver, for example. The rotating electrical machine 1 also includes a rotational speed detector E for detecting a rotational speed of the rotor 3. The rotational speed detector E, which is an encoder herein, is disposed at a side of the rotor 3, generates pulses in synchronization with the rotation of the shaft 8, and counts the pulses, thereby making it possible to measure the rotational speed. The rotating electrical machine 1 detects a magnet position on the basis of a signal from the magnetic pole position detector PS, and detects the rotational speed on the basis of an output signal form the rotational speed detector E. A control device (not shown) supplies to the stator windings 5 alternating-current (AC) current for generating target torque of the rotating electrical machine 1. The control device controls the current supplied to the stator windings 5, and thereby controls the output torque of the rotating electrical machine.

Figure 3:
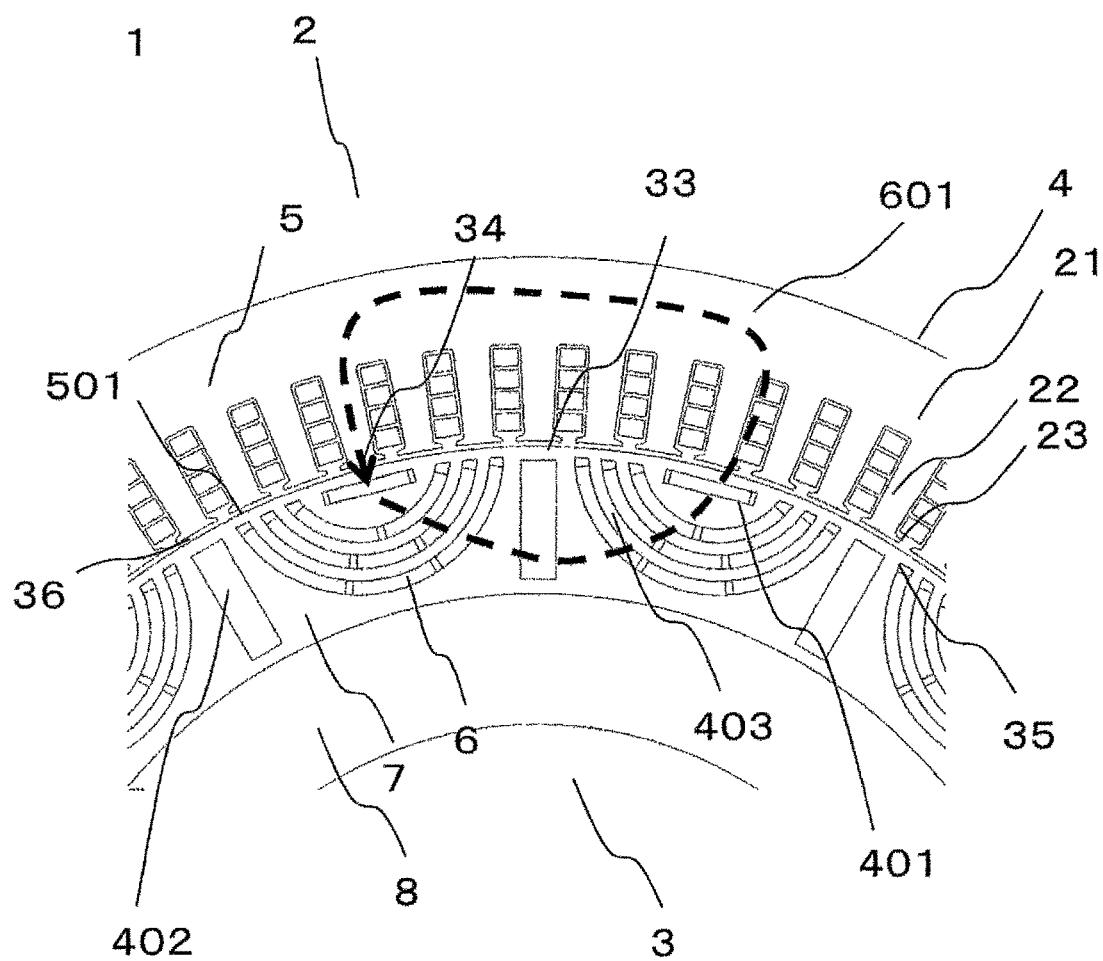
FIG. 3 is a partial enlarged view of FIG. 2.

The permanent magnets 400 include first magnets 401 disposed near a d-axis and near the stator, magnets 402 disposed near a q-axis, and permanent magnets 403 disposed between magnetic circuits of the permanent magnets 401 and the permanent magnets 402 (illustrated in FIG. 3).

Figure 2:
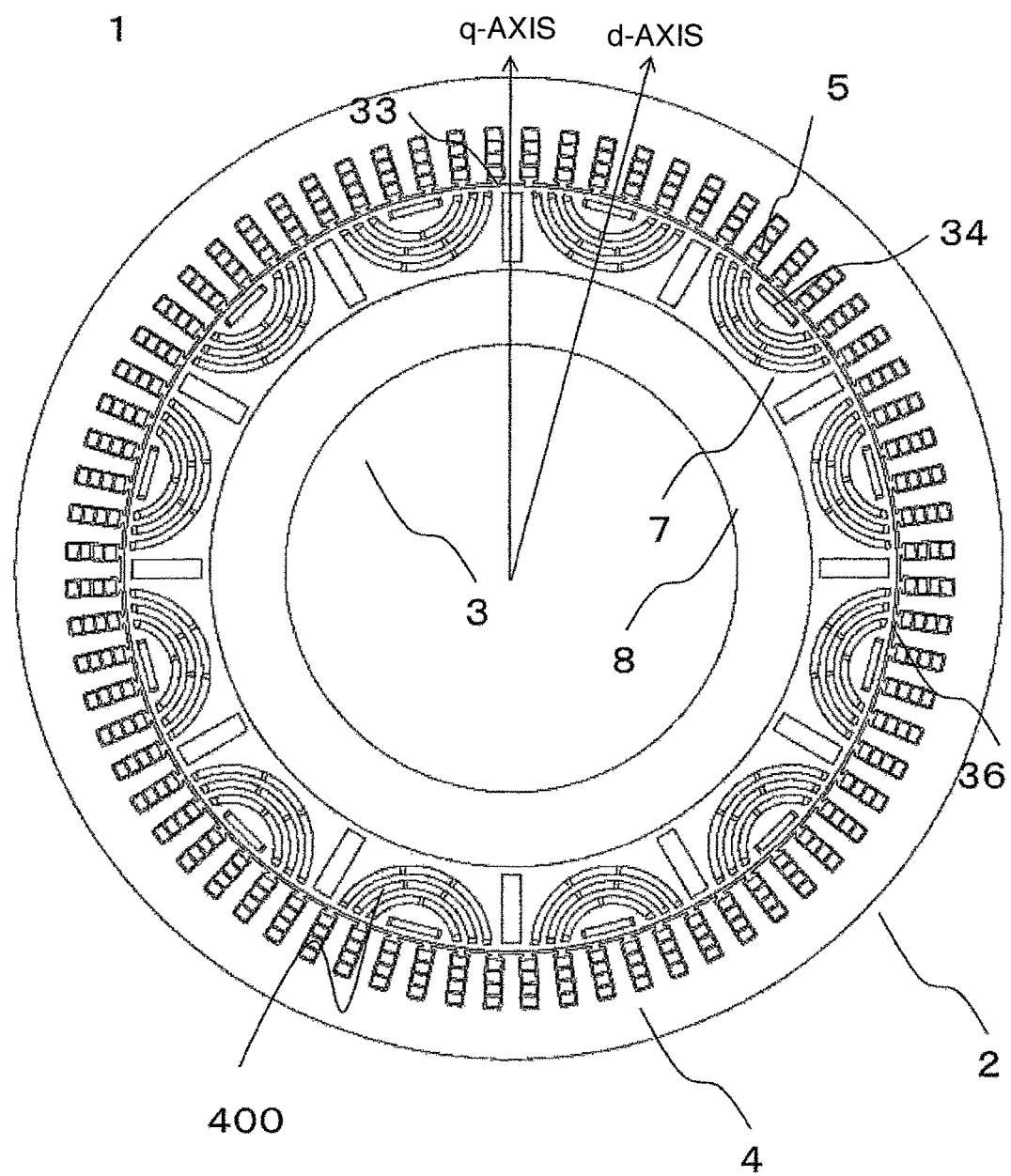
FIG. 2 is a cross-sectional view perpendicular to a rotary shaft of the rotating electrical machine shown in FIG. 1.

FIG. 2 is a cross-sectional view perpendicular to a rotary shaft of the rotating electrical machine shown in FIG. 1. The housing is not shown in FIG. 2 to avoid complication. FIG. 3 is a partial enlarged view of FIG. 2. In FIGS. 2 and 3, the rotating electrical machine 1 includes the stator 2 and the rotor 3, and the stator 2 includes the stator core 4 and the stator windings 5 wound around the slots formed in the stator core 4 near the rotor side over the whole circumference of the stator core 4 in a circumferential direction. The stator core 4 includes a substantially cylindrical yoke portion 21 which is also called a core back and teeth portions 22 which protrude from the yoke portion 21 inwardly in a radial direction, and the teeth portions 22 are formed over the whole circumference. The slots, which are formed between the adjacent teeth portions 22, house and hold the stator windings. A three-phase AC current is supplied to the stator windings disposed over the whole circumference, and a rotating magnetic field is thereby generated in the stator. Furthermore, magnetic flux generated by the rotor, which will be described later, is interlinked with the stator windings to rotate the rotor, and the interlinkage magnetic flux is thereby changed to generate induced voltage at the stator windings.

The rotor 3 includes the rotor core 7 formed of electric magnetic steel sheets laminated in a direction along the rotary shaft, and the permanent magnets 401, 402 and 403 provided in the rotor core 7 for forming the magnetic poles. In the embodiment illustrated in FIG. 2 and FIG. 3, the magnets 403 arranged in an arc-shape form one magnetic pole, or each magnetic pole. Each magnet forming a magnetic pole is magnetized in a d-axis. If the magnet is magnetized so that the rotor side of one magnetic pole is an N pole, magnets forming both adjacent magnetic poles of the magnetic pole are magnetized so that the rotor sides are an S pole in contrast. In Embodiment 1, as described above, a set of at least three types of magnets forms each magnetic pole, but the third magnets are not limited to magnets arranged in an arc-shape. The third magnets may be arranged in a V shape or arranged in a combined shape of a V shape and a bathtub-like shape. As an amount of the magnets forming the magnetic poles is increased, an amount of the magnetic fluxes of the magnetic poles are increased, and thus, rotation torque generated tends to increase, or induced voltage induced tends to increase.

In FIG. 1 to FIG. 3, if a reference sign is assigned to all parts or portions concerned, it will be complicated. Accordingly, a reference sign is assigned only to some parts or portions, that is, a reference sign is assigned one of the same components as a representative and reference signs to the others are omitted. In the later-described embodiments, a structure of a rotating electrical machine in which magnets are arranged inside a rotor core (referred to as magnet buried rotating electrical machine) is described. A rotating electrical machine in which permanent magnets forming magnetic poles are arranged on a stator-side outer circumferential surface of a rotor core (referred to as surface magnet rotating electrical machine) exhibits a remarkable effect to suppress variation of generated rotation torque, though efficiency degrades, and thus, the surface magnet rotating electrical machine is suitable for a motor to assist steering force, for which variation of generated rotation torque is required to be suppressed. In contrast, since a magnet buried rotating electrical machine can make a gap between a rotor and a stator small, the magnet buried rotating electrical machine is suitable for a high-efficient rotating electrical machine, or a small but high-output rotating electrical machine, and thus, suitable for a rotating electrical machine for travel of an automobile. The embodiments described later are suitable for a rotating electrical machine for travel of an automobile.

In the embodiment illustrated in FIGS. 2 and 3, the magnet insertion holes 6 for inserting the permanent magnets into the rotor core 7 and fixing the permanent magnets are disposed to correspond to the respective magnets. The magnet insertion holes 6 disposed to correspond to the respective magnet poles are arranged open to the stator side, and arranged over the whole circumference while corresponding to respective magnetic poles. Furthermore, the magnet insertion holes 6 serve for preventing d-axis inductance Ld from increasing, and thus, also serve for improving reluctance torque which is generated by the difference between Lq and Ld. Accordingly, it is not necessary to fill a magnet in the magnet insertion hole 6, and alternatively, a material having relative permeability lower than that of the rotor core may be filled.

Each magnet insertion hole 6 of the rotor core 7 is formed by press punching processing, for example. The stator core 7, which is formed of electric magnetic sheets laminated in a direction along the rotary shaft, is fixed at a shaft 8 (not illustrated), and the stator core 7 rotates with the shaft 8.

The rotor core 7 of the rotor 3 has auxiliary magnetic poles 33 formed over a whole circumference of the rotor core 7, for letting q-axis magnetic flux Φd generated by the stator pass between adjacent magnetic poles in a circumference direction. A part of the rotor core 7 is illustrated in FIG. 3. Conversely, in FIG. 3, the magnetic poles formed by the permanent magnets are disposed each between the adjacent auxiliary magnetic poles 33, and the magnetic poles are configured in a state where a plurality of permanent magnets are arranged open to the stator side, in the present embodiment. The permanent magnets to be housed and held in the magnetic insertion holes are preferably made of material having low recoil permeability since the permanent magnets serve as a flux barrier. The d-axis magnetic flux Φd generated by the permanent magnet 401, the permanent magnets 402 and the arc-shaped permanent magnets 403 passes through the stator 2 via a magnetic pole piece 34 which is formed by the stator core 7 between the outer circumference of the rotor and the permanent magnets, and a gap 36 between the rotor 3 and the stator 4, passes through the adjacent permanent magnet 401 and permanent magnets 403 of the other magnetic pole, the permanent magnet 402, and the permanent magnets 403, and returns to the first permanent magnet 401, thereby forming magnetic circuits 601 and 602. At the stator 2 the magnetic flux Φd passing through the magnetic circuit interacts with current passing through the stator windings 5, and thereby rotation torque is generated. The magnetic flux Φd passing through the magnetic circuit interlinks with the stator windings 5, and thereby induced voltage is generated at the stator windings 5 (see FIG. 1) based on a change amount of the interlinkage magnetic flux per unit time. Although some parts are inaccurately illustrated in the distribution diagrams of the magnetic flux in FIG. 2 and FIG. 3, the magnetic flux Φd passes along the magnetization direction inside the permanent magnet 401 to the permanent magnets 403, enters and exits the surfaces of the magnets perpendicularly, and enters and exits the surfaces of the stator core 4 and the rotor core 7 perpendicularly.

Based on the difference between the magnetoresistance of the q-axis magnetic flux Φd passing through the auxiliary magnetic pole 33 and the magnetoresistance of the magnetic circuit including the permanent magnets through which the d-axis magnetic flux Φd passes, reluctance torque is generated. In the present embodiment, as illustrated in FIG. 3, since the auxiliary magnetic pole 33 is wide in the circumference direction, the magnetoresistance of the magnetic circuit of the magnetic flux Φd passing through the auxiliary magnetic pole 33 is small. In contrast, the magnetoresistance of the magnetic circuit through which the magnetic flux Φd passes is extremely high, since there are two sets of the permanent magnets having low permeability. Accordingly, large reluctance torque is generated in the present embodiment. Total torque required for the rotating electrical machine is the sum of the magnet torque and the reluctance torque, and thus, when large reluctance torque is generated, the required magnet torque may be small correspondingly. In the rotating electrical machine illustrated in FIG. 2 and FIG. 3, reluctance torque is used partially for torque generated by the rotating electrical machine, for example, almost half of the required magnets is covered by the reluctance torque, and thus, the rotating electrical machine has a structure in which even if magnetic flux density Br of the magnet is small, the required magnetic torque may be small. However, since a large ratio of the reluctance torque means a large inductance, there are also demerits that the power factor deteriorates and the maximum output decreases. In this regards, the rotating electrical machine of the present embodiment is suitable even for high speed rotation since a large number of magnets are included to reduce the impedance.

In FIG. 2 and FIG. 3, the plurality of magnet insertion holes 6 arranged in a bathtub-like shape are formed in the rotor core 4, and the plurality of permanent magnets 401 to 403 are each inserted through the magnet insertion holes 6. In the present embodiment, at each end of the permanent magnets 401 to the permanent magnets 403 (illustration of ends of the permanent magnets 402 are omitted), a gap 35 which is magnetic (hereinafter, referred to as magnetic gap) is formed. The magnetic gap 35 is a space having a characteristic similar to a vacuum or air magnetoresistance of which is extremely large, and is also a space which is filled with nothing or resin and in which a paramagnet or ferromagnetic material does not exist. Hereinafter described is a similar configuration, there are separate magnetic gaps though. Each magnet insertion hole 6 is formed to be larger than a magnet inserted in the slot.

The actions of the magnetic gap 35 are as follows. The magnetic gaps 35 form bridge portions 501 between the respective magnetic gaps 35 which are each formed by the rotor core at the stator side of the permanent magnets. The bridge portion 501 performs supporting action to prevent the rotor 3 from being brown off by centrifugal force. When the bridge portion is made to have a thin and long shape, magnetic saturation is generated in the bridge portion 501, for example, and the value of a leakage amount of the magnetic flux can be made small. Furthermore, such shape can increase the magnetoresistance of the bridge portion 501, and as a result, an amount of the magnetic flux which passes through the bridge portion. Thus, the mechanical reliability may be improved.

Moreover, rapid change in magnetic flux density at a boundary between the auxiliary magnetic pole 33 and the permanent magnets may generate a torque ripple. However, as in the present embodiment, the magnetic gap 35 is provided at the stator-side end of a set of permanent magnets including the permanent magnets 401 to the permanent magnets 403 arranged in a bathtub-like shape, and thus, there is an effect that rapid change in magnetic flux density at the boundary between the auxiliary magnetic pole 33 and the permanent magnets can be reduced to reduce a torque ripple.

In the present embodiment, each of the permanent magnets is inserted in the magnet insertion hole 6, and the permanent magnets are arranged in a direction in which magnetization easy-axis of each permanent magnet is along the magnetic circuit of the magnetic flux $\Phi d$. The magnetization easy-axis of the permanent magnet is a direction which facilitates magnetization of the magnet. The permanent magnets 401 to the permanent magnets 403 illustrated in FIG. 2 and FIG. 3 are formed with short directions thereof being the magnetization easy-axis. The permanent magnets are arranged such that the magnetization facilitating axes are along a direction of a wavy arrow in FIG. 3. The direction along the wavy arrow is a direction of the d-axis magnetic flux $\Phi d$, as described above.

In the present embodiment, the permanent magnets are inserted and fixed in the respective magnet insertion holes 6, and thus, a volume necessary for holding the magnets in the rotor can be made small, resulting in downsizing the rotor.

Figure 4:
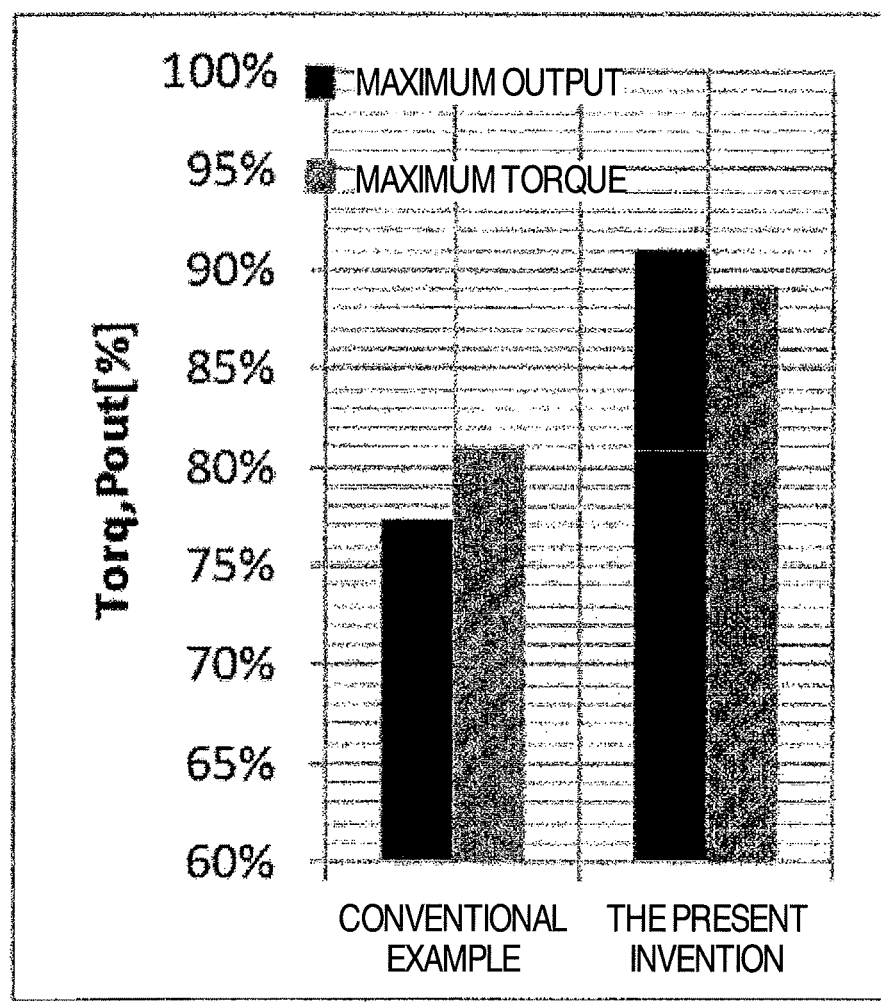
FIG. 4 is a diagram illustrating an effect of the present invention.

FIG. 4 illustrates comparison between the conventional example and the present embodiment, where the conventional example is a motor including only permanent magnets 403 of ferrite magnet without the permanent magnet 401 or the permanent magnet 402 inserted, and also in the present embodiment, the permanent magnets are ferrite magnet. In the illustration, motor performance of an Nd+Dy configuration is set to be 100%. A result of the comparison shows that the maximum output increases from 77% to 91%, while the maximum torque increases from 81% to 89%.

Embodiment 2

Figure 5:
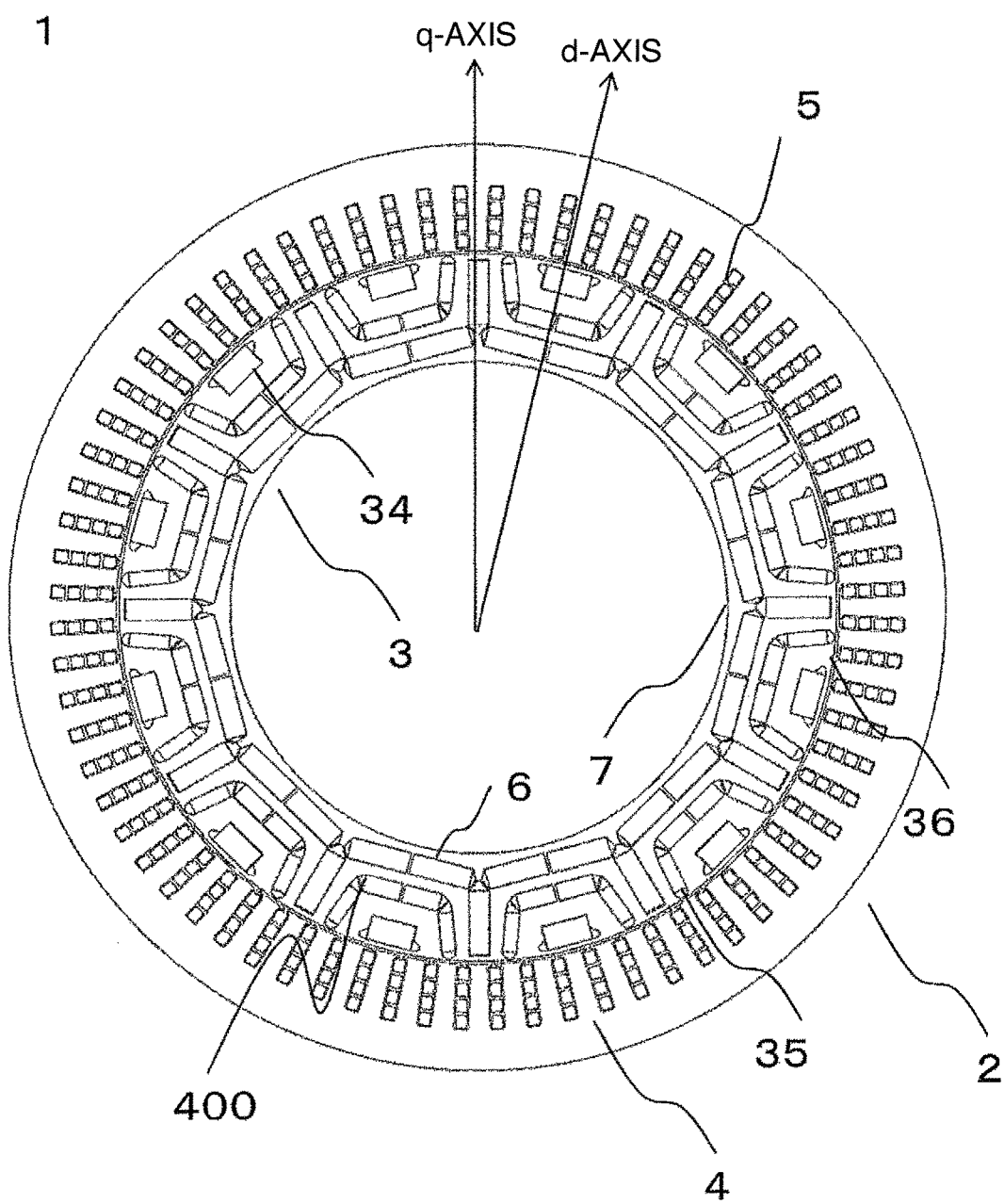
FIG. 5 is a cross-sectional view of a rotating electrical machine according to Embodiment 2 of the present invention.
Figure 6:
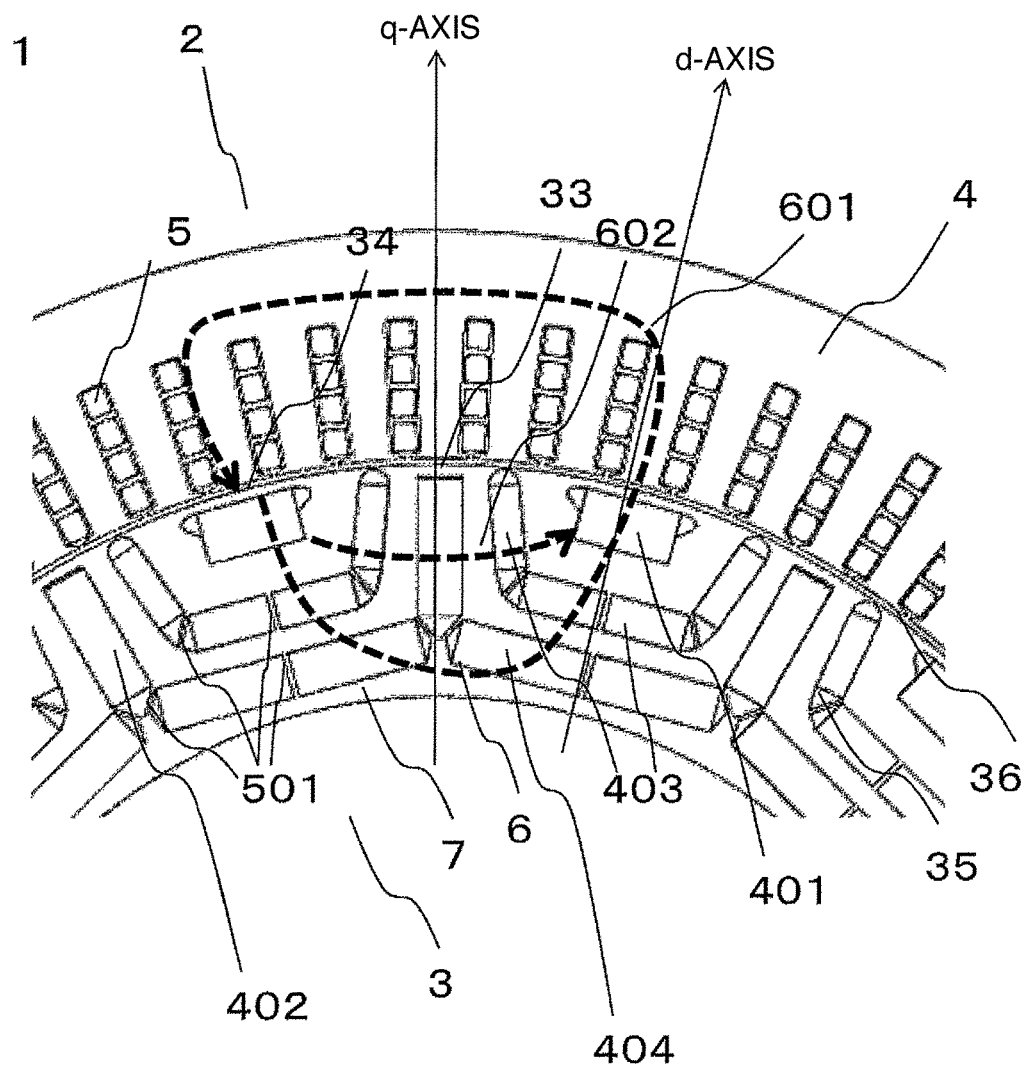
FIG. 6 is a partial enlarged view of FIG. 5.

FIG. 5 and FIG. 6 illustrate an embodiment in which a fourth magnet 404 is inserted. In the embodiment, a bathtub structure is applied to withstand high-speed rotation mechanically, and also, the fourth magnet 404 is inserted in order to increase magnetic flux further.

Embodiment 3

Figure 7:
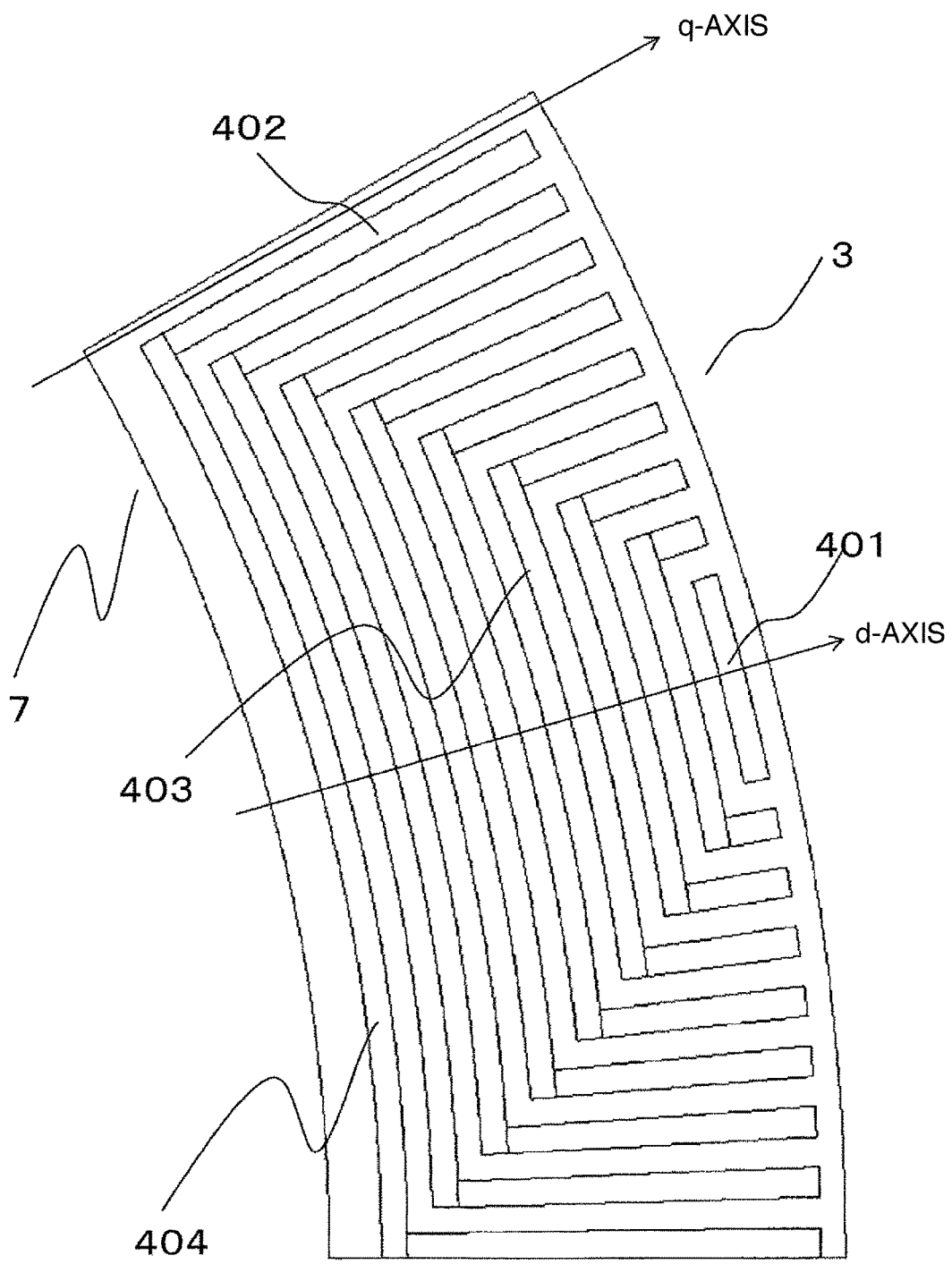
FIG. 7 is a cross-sectional view of a rotor according to Embodiment 3 of the present invention.

FIG. 7 illustrates a rotor of an embodiment in which a large number of magnets as a flux barrier are laminated. It is a structure in which a bridge, which causes increase in Ld, is made thin. In the case of low-speed rotation, the problem of centrifugal force becomes less important, and thus, the shape in the present embodiment can be manufactured by two-color molding of a powder magnetic core and a magnet.

Embodiment 4

Figure 8:
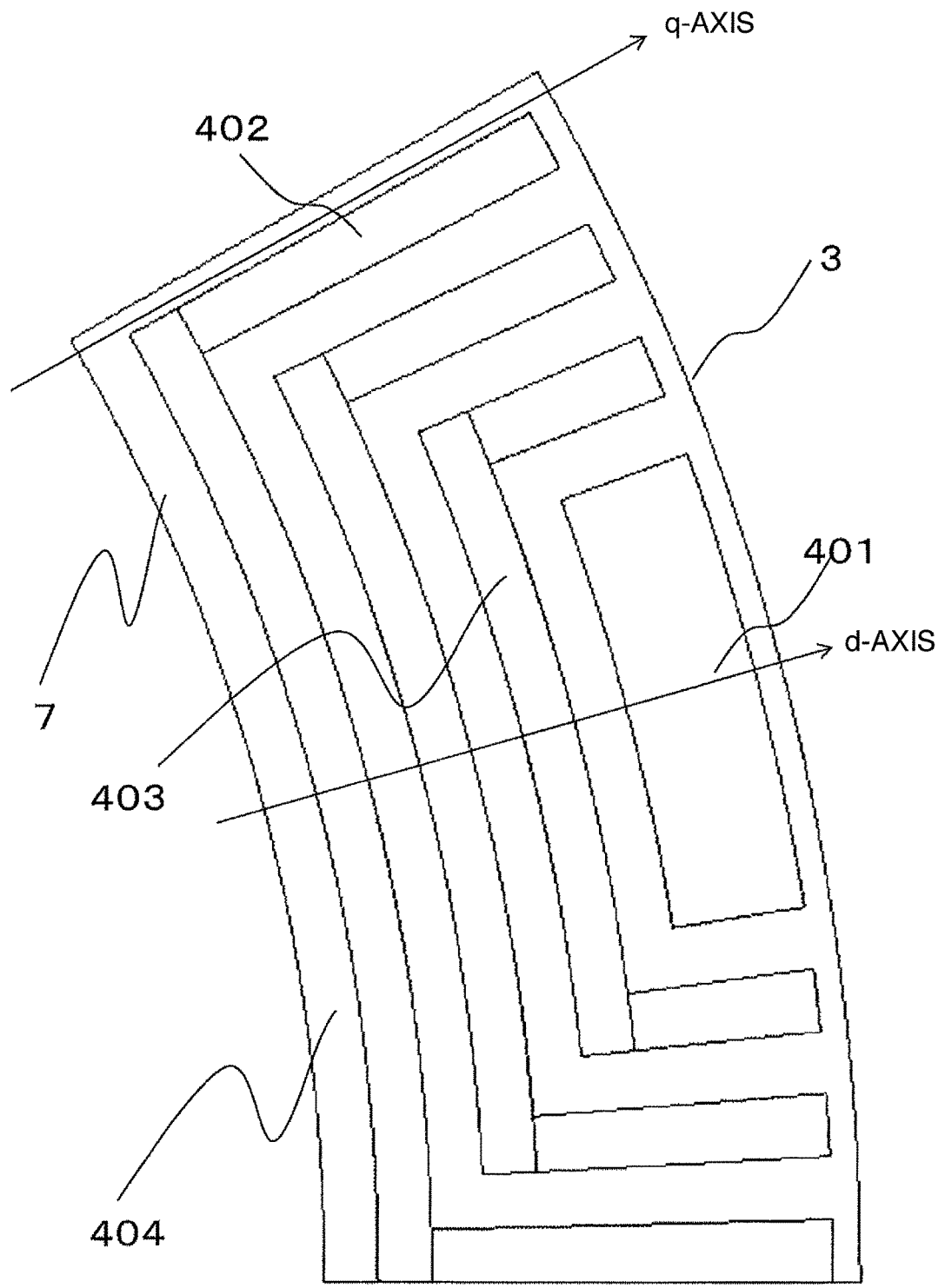
FIG. 8 is a cross-sectional view of a rotor according to Embodiment 4 of the present invention.

FIG. 8 illustrates a part of a rotor of an embodiment in which the number of laminated magnets is reduced, and the magnets are made thick in order to improve the demagnetization durability of the magnets.

Embodiment 5

Figure 9:
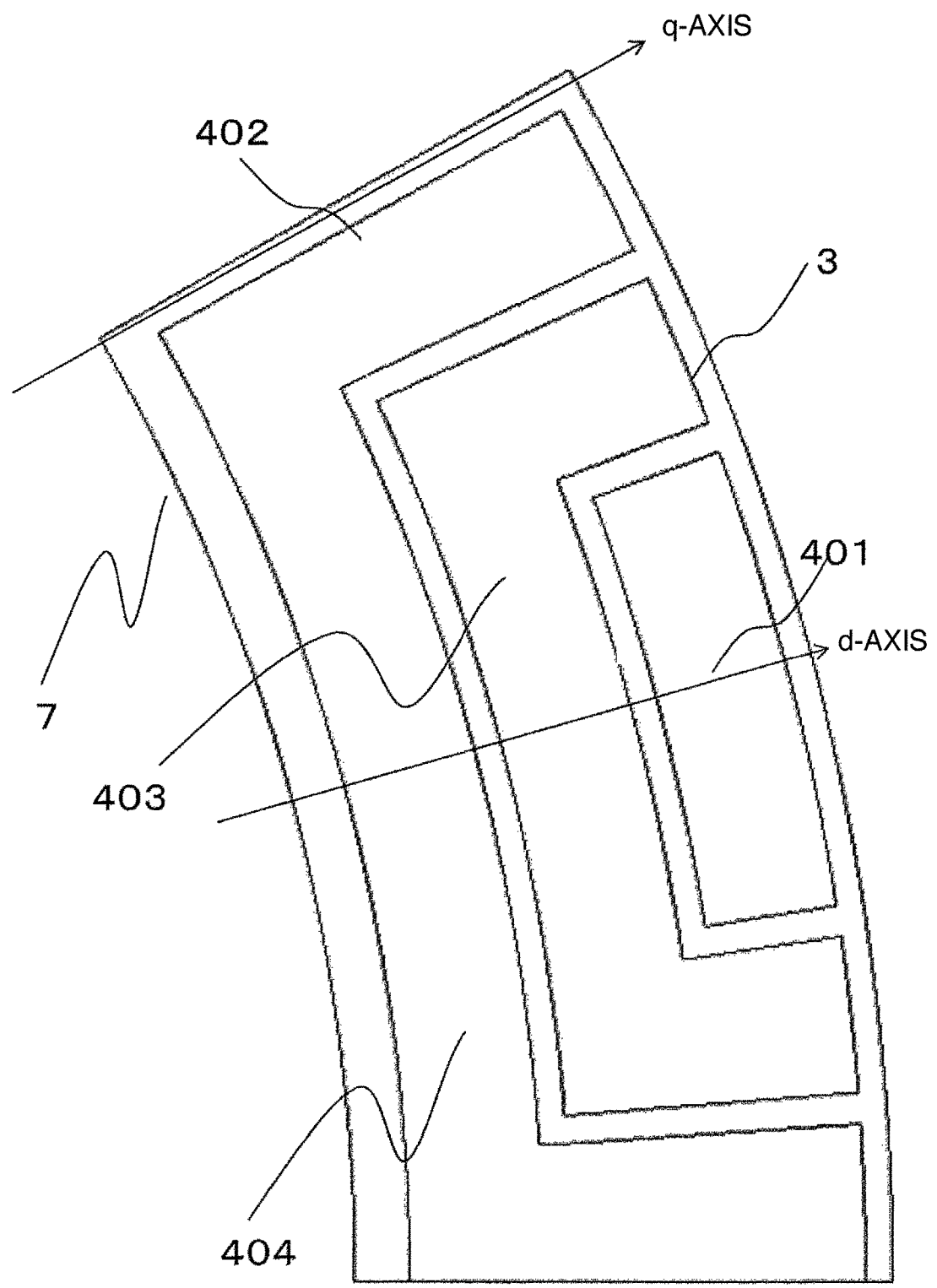
FIG. 9 is a cross-sectional view of a rotor according to Embodiment 5 of the present invention.

FIG. 9 illustrates a part of a rotor of an embodiment in which the number of laminated magnets is further reduced, and a ratio of the magnet to the core is increased in order to increase a power factor.

Embodiment 6

Figure 10:
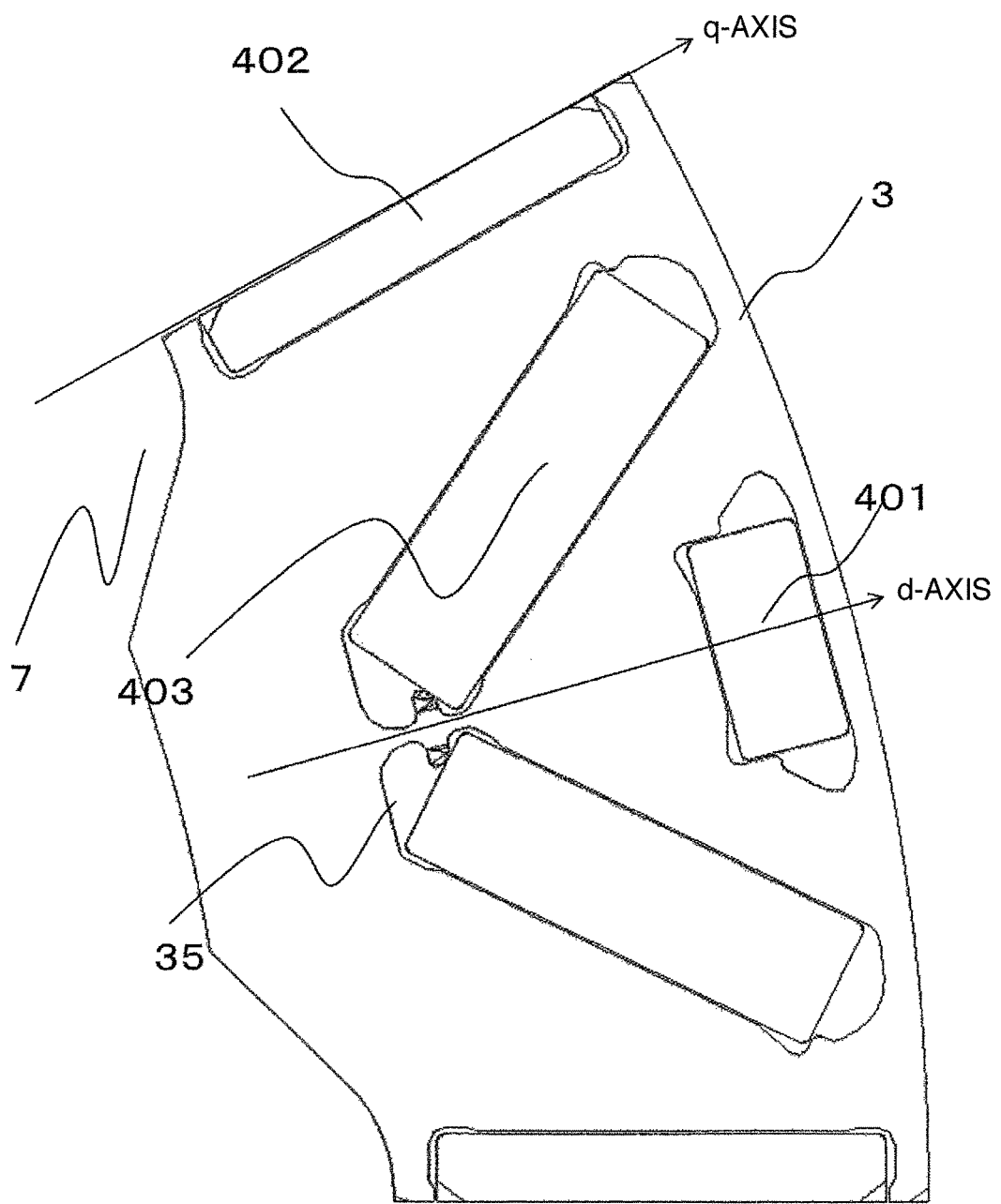
FIG. 10 is a cross-sectional view of a rotor according to Embodiment 6 of the present invention.

FIG. 10 illustrates a part of a rotor of an embodiment in which magnets 403 are arranged in a V shape to minimize leakage of magnetic flux at both ends of the magnets, a magnetic gap 35 is provided for stress dispersion, a core internal diameter at the inner diameter side of a magnet 402 is shaved to reduce Ld, and the sizes of the magnet 402 and the magnet 403 are made equal, and thereby reduction in the number of types of the magnets is achieved.

Embodiment 7

Figure 11:
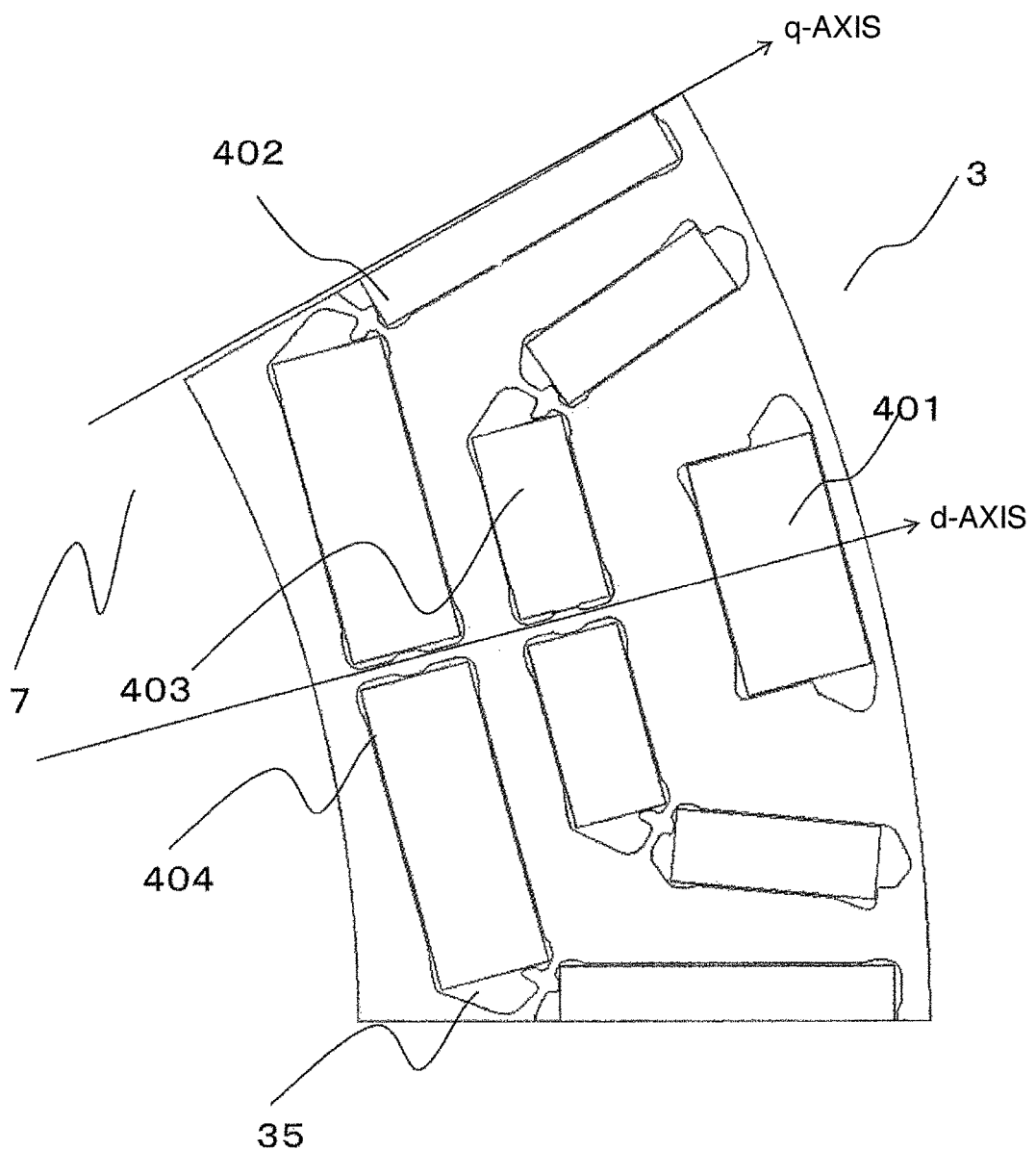
FIG. 11 is a cross-sectional view of a rotor according to Embodiment 7 of the present invention.

FIG. 11 illustrates a part of a rotor of an embodiment in which a magnet 402, a magnet 403 and a magnet 404 are configured to be a bathtub-like shape to increase magnetic flux, in order to improve the strength against centrifugal force.

Figure 12:
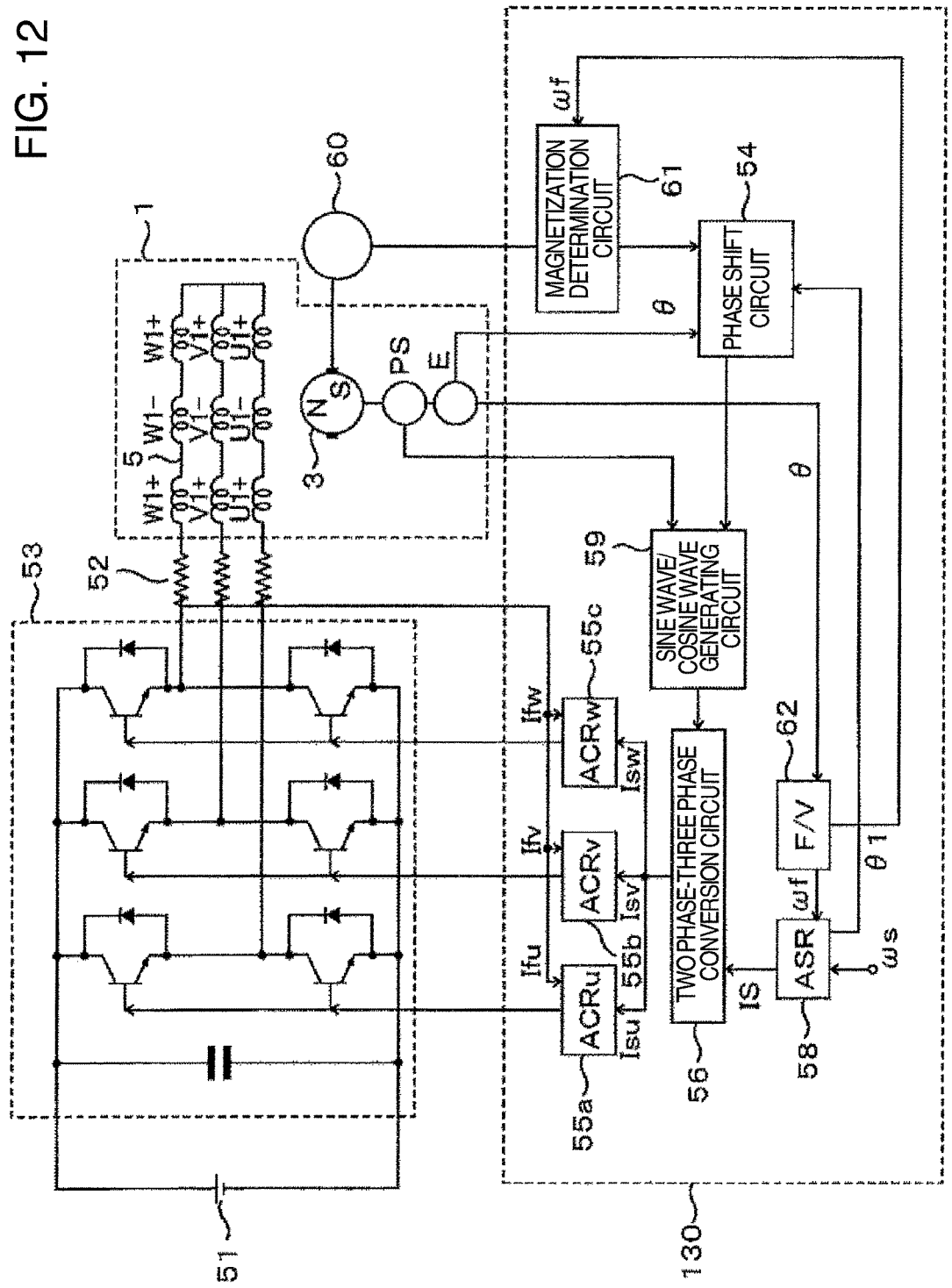
FIG. 12 is a system diagram for driving a rotating electrical machine.

Next, a description will be given of a configuration of a rotating electrical machine apparatus according to an embodiment of the present invention with reference to FIG. 12. Here, Embodiment 1 is used as an example. The rotating electrical machine 1 includes a DC power supply 51 to form a power supply for driving the rotating electrical machine 1, and a control device which controls power supplied to the rotating electrical machine 1 to control the driving.

The rotating electrical machine 1 using the permanent magnets has the aforementioned structure or a later-described structure. The DC power supply 51 may be formed of an AC power supply and a converter portion to convert AC current from the AC power supply to DC current, and may be a lithium ion secondary battery or nickel-hydrogen secondary battery mounted in a vehicle, for example. The control device is an inverter device which receives DC current from the DC power supply 51 and inverts the DC current to AC current to supply the AC current to the stator windings 5 of the rotating electrical machine 1. The inverter device includes an inverter circuit 53 (power inversion circuit) of a power system electrically connected between the DC power supply 51 and the stator winding 5, and a control circuit 130 to control operation of the inverter circuit 53.

The inverter circuit 53 includes a bridge circuit including a switching semiconductor element such as a MOS-FET (metal oxide semiconductor filed effect transistor) or an IGBT (insulated gate bipolar transistor), and inverts AC current from a smoothing capacitor module to DC current or converts AC current generated by the rotating electrical machine to DC current. The bridge circuit is configured by including as many circuits, which are called an arm, as the phases of the rotating electrical machine 1, the arm includes a high potential side switch, a low potential side switch and a series circuit connected electrically in parallel. In the present embodiment where three-phase AC power is generated, three arms are provided. The terminal of the high potential side switch of each arm is electrically connected to the positive side of the DC current power supply 51, and the terminal of the low potential side switch is electrically connected to the negative side of the DC current power supply 51. The connection point of the upper switching semiconductor element and the lower switching semiconductor element of each arm is electrically connected with the stator winding 5 so as to supply phase voltage to the stator winding 5 of the rotating electrical machine 1.

Phase current supplied from the inverter circuit 53 to the stator windings 5 is measured with a current detector 52 which is respectively provided at the bus bar of each phase for supplying AC power to the rotating electrical machine. The current detector 52 is a current transformer, for example. The control circuit 130 acts to control switching operation of the switching semiconductor elements of the inverter circuit 53 for obtaining target torque based on input information including a torque command and a braking command. As the input information, for example, a current command signal Is which is required torque for the rotating electrical machine 1 and a magnetic pole position θ of the rotor 3 of the rotating electrical machine 1 are input. The current command signal Is which is required torque is obtained by the control circuit 130 performing calculation based on the command which is sent by an upper-order controller in accordance with a required amount such as an accelerator operation amount required by a driver in the case of an automobile. The magnetic pole position θ is detected information obtained from the output of the magnetic pole position detector PS.

A speed control circuit 58 calculates a speed difference we using a speed command ωs, which is created based on the required command of the upper-order controller, and actual speed ωf, which is obtained from position information θ1 from an encoder via an F/V converter 61 which converts a frequency into voltage, and the current command Is which is a torque command and the rotational angle θ1 of the rotor 3 are output to the speed control circuit 58 under PI control. The PI control is a control method in general use, which uses a proportional term P obtained by multiplying a multiplier of proportionality to a deviation value and an integral term I.

A phase shift circuit 54 shifts the phase of a synchronized pulse of rotation generated by a rotational speed detector E, that is, the position information θ of the rotor 3, corresponding to a command of the rotational angle θ1 from the speed control circuit 58 and outputs the resultant information. The phase shift is performed in such a way that the resultant vector of armature electromagnetic force generated by the current passing through the stator winding 5 advances by an electric angle of 90 degrees or more relative to a direction of magnetic flux or a magnetic field created by the permanent magnet 400.

A sine wave/cosine wave generating circuit 59 generates a sine wave output caused by the phase shift of induced voltage of each winding wire of the stator windings 5, based on the position detection PS detecting the magnetic pole position of the permanent magnet 400 of the rotor 3 and position information θ of the rotor subjected to the phase shift and sent from the phase shift circuit 54. Here, the phase shift amount includes a value of zero.

A two phase-three phase circuit 56 outputs current commands Isu, Isv, Isw of each phase, corresponding to the current command IS from the speed control circuit 58 and outputs from the sine wave/cosine wave generating circuit 59. Each phase has an individual current control system 55a, 55b or 55c, which sends a current command Isu, Isv or Isw and a signal corresponding to a current detection signal Ifu, Ifv or Ifw from the current detector 52, respectively, to the inverter circuit 53 to control switching operation of the switching semiconductor element, and thereby each of the phase currents of the three-phase AC current is controlled. In this case, a composed current of the phases is controlled at a position perpendicular to the field magnetic flux or a position where the phase is shifted, and thereby a non-commutator configuration and a characteristic equal to that of a DC machine can be achieved.

A signal output from the current control system 55a, 55b or 55c of each phase of the AC currents is input to a control terminal of the switching semiconductor of the arm of the corresponding phase. Accordingly, the respective switching semiconductor performs switching operation, which is on/off operation, and DC power supplied from the DC power supply 51 via the smoothing condenser module is inverted to AC power to be supplied to the corresponding phase winding wire of the stator winding 5.

The inverter device of the present embodiment 1 always forms current passing through the stator winding 5 (phase current passing through each phase winding wire) such that the resultant vector of armature magnetomotive forces passing through the stator winding 5 is perpendicular to the direction of the magnetic flux or magnetic field generated by the permanent magnet 400 or subjected to phase shift. Consequently, in the rotating electrical machine of the present embodiment 1, with the use of the non-commutator type or brushless rotating electrical machine 1, a characteristic equal to that of a DC machine can be achieved. Field-weakening current exerts a control to always form current passing through the stator winding 5 (phase current passing through each phase winding wire) so that the resultant vector of the armature magnetomotive forces generated by the current passing through the stator winding 5 advances by 90 degrees (electric angle) or more relative to the direction of the magnetic flux or magnetic field generated by the permanent magnet 400.

Therefore, in the rotating electrical machine of the present embodiment 1, by controlling the current passing through the stator winding 5 (phase current passing through each phase winding wire) based on the magnetic pole position of the rotor 3 so that the resultant vector of the armature magnetomotive forces generated by the current passing through the stator winding 5 is perpendicular to the direction of the magnetic flux or magnetic field generated by the permanent magnet 400, it is possible for the rotating electrical machine 1 to continuously output maximum torque. If field-weakening current is required, the current passing through the stator winding 5 (phase current passing through each phase winding wire) may be controlled based on the magnetic pole position of the rotor 3 so that the resultant vector of the armature magnetomotive forces generated by the current passing through the stator winding 5 advances by 90 degrees (electric angle) or more relative to the direction of the magnetic flux or magnetic field generated by the permanent magnet 400.

Next, a description will be given of a method of determining magnetization and a method for magnetization in the case where a demagnetizable permanent magnet 400 such as a ferrite magnet is used. The rotating electrical machine 1 further includes a magnetic flux detector 60, a value representing a magnetic flux amount output by the magnetic flux detector 60 and an actual speed (of output by the F/V converter 62 are input into a magnetization determination circuit 61, and thus, it is determined whether re-magnetization is necessary or not. If strong magnetic flux exceeding the range of irreversible demagnetization applied to the permanent magnet due to application of the magnetic flux based on the field-weakening current to the permanent magnet 400, the permanent magnet, especially the second permanent magnet 402 may be demagnetized. If the irreversible demagnetization occurs in this way, a magnetic flux amount generated by the permanent magnet is reduced, and thus, re-magnetization of the permanent magnet is necessary. When it is determined that re-magnetization of the permanent magnet is necessary, the magnetization determination circuit 61 outputs a magnetization command to the phase shift circuit 54.

Next, a description will be given of a magnetizing method for the second permanent magnet 402 in the case of the magnetization determination circuit 61 outputs a magnetization command to the phase shift circuit 54. A special magnetization circuit for magnetization may be used as a matter of course, but even without using such a special magnetization circuit, a certain degree of re-magnetization is possible with the use of the control circuit 130. FIG. 8 illustrates a relationship between a current phase and torque in the rotating electrical machine with the permanent magnets included therein. Here, a current phase of zero degrees is the q-axis. When the permanent magnet 400, particularly the second permanent magnet 402 is irreversibly demagnetized, the current passing through the stator winding 5, that is, phase current passing through each phase winding wire is controlled such that the resultant vector of the armature magnetomotive forces generated by current passing through the stator winding 5 is delayed by an electric angle of approximately 90 degrees relative to the direction of the magnetic flux or magnetic field generated by the permanent magnet 400. The phase current supplied to the stator winding 5 is controlled in this way, and thereby the resultant vector of the armature magnetomotive forces generated by current passing through the stator winding 5 points in a direction to increase the magnetization of the permanent magnet 400. Consequently, it is possible to magnetize the permanent magnet 400, especially the second permanent magnet 402, and specifically, it is possible to increase again the magnetization state which has been demagnetized.

In the aforementioned description, an internal rotation type rotating electrical machine is exemplified, but the present invention may be also applied to an external rotation type rotating electrical machine. Furthermore, the present invention may be also to both a distributed winding type rotating electrical machine and a concentrated winding type rotating electrical machine.

Figure 13:
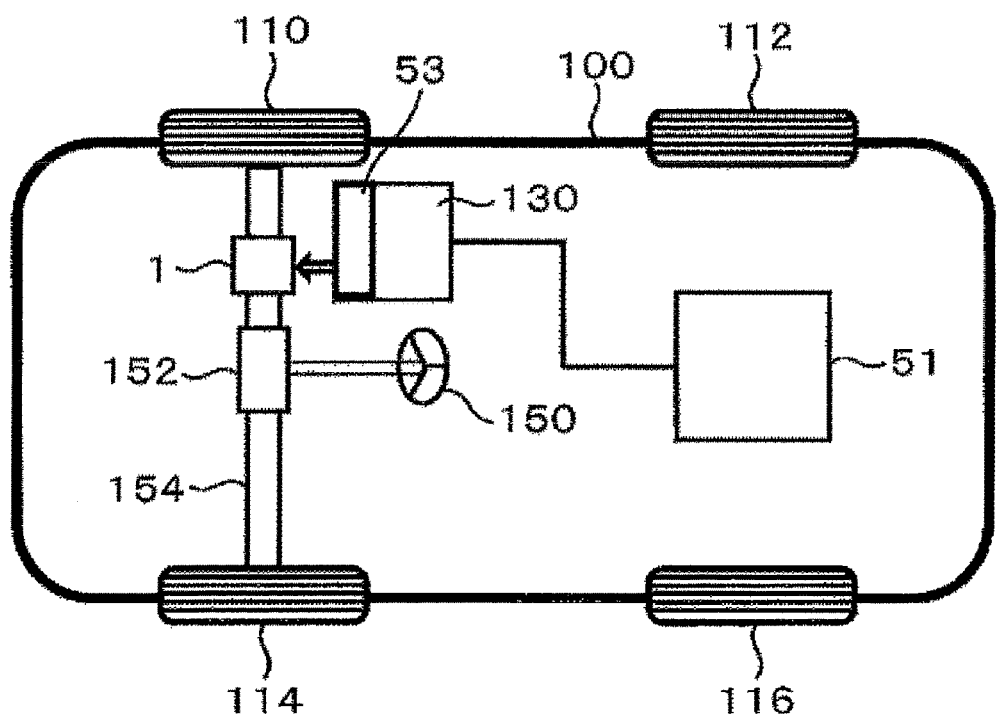
FIG. 13 is a block diagram of an embodiment in which the present invention is applied to an electric vehicle.

Next, a description will be given of an example where the aforementioned embodiment is applied to an electric vehicle with reference to FIG. 13. FIG. 13 is a block diagram of an electric vehicle to which the present invention is applied.

A vehicle body 100 of an electric vehicle is supported by four wheels 110, 112, 114 and 116. Since the electric vehicle is a front-wheel-drive vehicle, a front axle 154 is mechanically connected with the rotating electrical machine 1 which generates travelling torque or braking torque, and thus, rotation torque generated by the rotating electrical machine 1 is transmitted by a mechanical transmission mechanism. The rotating electrical machine 1 is driven by the three-phase AC power generated by the control device 130 and the inverter circuit 53, which has been described with reference to FIG. 7, and the drive torque is controlled.

As a power source of the control device 130, the DC power supply 51 including a high-voltage battery such as a lithium secondary battery is provided. DC power from the DC power supply 51 is inverted to AC power by the inverter circuit 53 performing switching operation based on control of the control device 130, and then supplied to the rotating electrical machine 1. Rotation torque of the rotating electrical machine 1 drives the wheels 110 and 114, and thus, the vehicle travels.

Moreover, on brake operation by a driver, the control device 130 inverts the phase of the AC power generated by the inverter circuit relative to the magnetic pole of the rotor, and thereby the rotating electrical machine 1 acts as a generator and regenerative brake operation is performed. The rotating electrical machine 1 generates rotation torque in a direction for suppressing travel so that braking force to the travel of the vehicle 100 is generated. Here, kinetic energy of the vehicle is converted to electrical energy, and thus, the electrical energy is charged to the DC power supply 51.

In the embodiments described so far, it is described that the rotating electrical machine is to be used for driving wheels of an electric vehicle, but the rotating electrical machine may be used for a driving apparatus for electric vehicles, a driving apparatus for electric construction machine, or any other driving apparatuses. If the rotating electrical machine of the present embodiment is applied to an electric vehicle, especially to an electric vehicle, it is possible to provide an electric vehicle capable of improving the maximum rotating speed and providing a large output.

Note that the present invention is not limited to the aforementioned embodiments, and includes various modifications. For example, the aforementioned embodiments are described in detail for explaining the present invention in a way that is easy to understand, and the present invention is not necessarily limited to an embodiment including all the configurations described above. Part of the configurations of one embodiment may be replaced with other part of the configurations of another embodiment, and also, a configuration of one embodiment may be added to a configuration of another embodiment. Furthermore, to part of configurations of the embodiments, addition, deletion and replacement of another configuration are possible.

REFERENCE SIGNS LIST

1 rotating electrical machine
2 stator
3 rotor
4 stator core
5 stator winding
6 magnet insertion hole
7 rotor core
8 shaft
9 end bracket
10 bearing
11 housing
21 yoke portion of stator
22 teeth portion
23 slot
33 auxiliary magnetic pole
34 magnetic pole piece
35 magnetic gap
36 gap
51 DC power supply
52 current detector
53 inverter circuit
54 phase shift circuit
55a, 55b, 55c current control system of each phase
100 electric vehicle
110, 112, 114, 116 wheel
130 control device of electric vehicle
154 axle
400 permanent magnet
401 first permanent magnet A
402 second permanent magnet B 403 third permanent magnet C
404 fourth permanent magnet D
501 bridge
601, 602 magnetic path of magnetic flux Φd.
E rotational position detector
PS rotational speed detector

The invention claimed is:

1. A permanent magnet rotating electrical machine comprising:
   a stator including armature windings in a plurality of slots formed in a stator core; and
   a rotor including a rotor core and permanent magnets buried in a plurality of permanent magnet insertion holes provided in the rotor core, the rotor being rotatably supported by a rotary shaft via a gap on an inner circumferential side of the stator, wherein
   when an axis of magnetic flux for the permanent magnet is set as a d-axis, and a position deviated from the d-axis by an electric angle of 90 degrees is set as a q-axis,
   one of the permanent magnet insertion holes is located on the q-axis, and a first permanent magnet magnetized in a direction orthogonal to the q-axis is buried in the permanent magnet insertion hole,
   one of the permanent magnets insertion hole is also located on the d-axis, and a second permanent magnet magnetized in a direction parallel to the d-axis is buried in the permanent magnet insertion hole, and
   at least one third permanent magnet buried in one of the permanent magnet insertion holes is provided between the first permanent magnet and the second permanent magnet.

2. The permanent magnet rotating electrical machine according to claim 1, wherein one of the first permanent magnet and the second permanent magnet is configured to have a large area in a radial direction.

3. The permanent magnet rotating electrical machine according to claim 1, wherein the second permanent magnet is disposed on an outer circumferential side of the rotor core.

4. The permanent magnet rotating electrical machine according to claim 1, wherein the first permanent magnet is configured to be long in a radial direction and short in a circumferential direction, and the second permanent magnet is configured to be short in the radial direction and long in the circumferential direction.

5. The permanent magnet rotating electrical machine according to claim 1, wherein the third permanent magnet is formed of two permanent magnets, and is disposed into a V shape so as to hold the second permanent magnet between the two permanent magnets.

6. The permanent magnet rotating electrical machine according to claim 1, wherein
   the permanent magnet insertion holes are located on an outer diameter side and an inner diameter side of the rotor core on the d-axis, the second permanent magnet and a fourth permanent magnet magnetized in the direction parallel to the d-axis are buried in the permanent magnet insertion holes, and
   at least one third permanent magnet buried in one of the permanent magnet insertion holes is provided between the first and second permanent magnets and the fourth permanent magnet.

7. The permanent magnet rotating electrical machine according to claim 6, wherein the third permanent magnet is formed of a permanent magnet A which is disposed on an outer diameter side of the fourth permanent magnet and on an inner diameter side of the second permanent magnet, and which is magnetized in a direction orthogonal to the d-axis and identical to a magnetization direction of the second and fourth permanent magnets, and a permanent magnet B which extends from a q-axis side circumferential end of the permanent magnet A toward an outer diameter side via a gap.

8. The permanent magnet rotating electrical machine according to claim 7, wherein the fourth permanent magnet and the permanent magnet A are each divided by the d-axis as a boundary into two parts in the circumferential direction.

9. The permanent magnet rotating electrical machine according to claim 6, wherein the third permanent magnet is formed of a plurality of permanent magnets A which are equally disposed on an outer diameter side of the fourth permanent magnet and on an inner diameter side of the second permanent magnet, circumferential widths of the plurality of permanent magnets A being reduced toward the outer diameter side, and a plurality of equally disposed permanent magnets B which extend from a q-axis side circumferential end of the permanent magnet A, radial lengths of the plurality of permanent magnets B being reduced from a portion near the q-axis to the d-axis, the third permanent magnet being formed into a plurality of recessed shapes.

10. An electric drive system comprising:
    a battery supplying electric power;
    a rotating electrical machine outputting drive torque by the supplied electric power; and
    a control device controlling the drive torque,
    wherein the rotating electrical machine is the permanent magnet rotating electrical machine according to claim 1.

11. A motor vehicle comprising a drive system,
    the drive system including
    a battery supplying power;
    a rotating electrical machine outputting drive torque for driving the motor vehicle by the supplied electric power; and
    a control device controlling the drive torque,
    wherein the drive system is the drive system according to claim 10.

12. An electric drive system comprising:
    a battery supplying electric power;
    a rotating electrical machine outputting drive torque by the supplied electric power; and
    a control device controlling the drive torque,
    wherein the rotating electrical machine is the permanent magnet rotating electrical machine according to claim 2.

13. An electric drive system comprising:
    a battery supplying electric power;
    a rotating electrical machine outputting drive torque by the supplied electric power; and
    a control device controlling the drive torque,
    wherein the rotating electrical machine is the permanent magnet rotating electrical machine according to claim 3.

14. An electric drive system comprising:
    a battery supplying electric power;
    a rotating electrical machine outputting drive torque by the supplied electric power; and
    a control device controlling the drive torque,
    wherein the rotating electrical machine is the permanent magnet rotating electrical machine according to claim 4.

15. An electric drive system comprising:
    a battery supplying electric power;

a rotating electrical machine outputting drive torque by the supplied electric power; and a control device controlling the drive torque, wherein the rotating electrical machine is the permanent magnet rotating electrical machine according to claim 5.

16. An electric drive system comprising:

a battery supplying electric power;

a rotating electrical machine outputting drive torque by the supplied electric power; and a control device controlling the drive torque, wherein the rotating electrical machine is the permanent magnet rotating electrical machine according to claim 6.

17. An electric drive system comprising:

a battery supplying electric power;

a rotating electrical machine outputting drive torque by the supplied electric power; and a control device controlling the drive torque, wherein the rotating electrical machine is the permanent magnet rotating electrical machine according to claim 7.

18. An electric drive system comprising:

a battery supplying electric power;

a rotating electrical machine outputting drive torque by the supplied electric power; and a control device controlling the drive torque, wherein the rotating electrical machine is the permanent magnet rotating electrical machine according to claim 8.

19. An electric drive system comprising:

a battery supplying electric power;

a rotating electrical machine outputting drive torque by the supplied electric power; and a control device controlling the drive torque, wherein the rotating electrical machine is the permanent magnet rotating electrical machine according to claim 9.

* * * * *